(12) United States Patent
Bradley

(10) Patent No.: US 6,225,956 B1
(45) Date of Patent: May 1, 2001

(54) ILLUMINATED VEHICLE ANTENNAE CONSTRUCTION

(76) Inventor: Schwayn D. Bradley, 601 Ashley Cir., Apt. #1, Brewton, AL (US) 36426

( * ) Notice: Subject to any disclaimer, the term of this patent is extended or adjusted under 35 U.S.C. 154(b) by 0 days.

(21) Appl. No.: 09/057,848

(22) Filed: Apr. 9, 1998

(51) Int. Cl.[7] ...................................................... B60Q 1/44
(52) U.S. Cl. .......................... 343/721; 362/232; 343/712; 84/464 R; 340/479
(58) Field of Search ..................................... 343/721, 712, 343/711; 340/479; 362/235, 226, 232; 84/464 R

(56) References Cited

U.S. PATENT DOCUMENTS

| | | | |
|---|---|---|---|
| 3,506,956 | * 4/1970 | Kolm et al. ............................. | 340/15 |
| 4,176,581 | 12/1979 | Stuyvenberg ....................... | 84/464 R |
| 4,394,656 | 7/1983 | Goettsche ......................... | 340/825.73 |
| 4,809,584 | 3/1989 | Forrest ................................. | 84/464 R |
| 5,056,399 | 10/1991 | Hornstein .............................. | 84/464 R |
| 5,448,456 | * 9/1995 | Huynh ................................. | 362/80 |
| 5,848,837 | * 12/1998 | Gustafson ............................ | 362/235 |

* cited by examiner

Primary Examiner—Don Wong
Assistant Examiner—James Clinger
(74) Attorney, Agent, or Firm—Henderson & Sturm LLP

(57) ABSTRACT

An illuminated vehicle antennae construction 10 operatively connected to a vehicle 102 and operatively associated with the vehicle sound system 100 wherein the antennae construction 10 includes a housing unit 11 provided with a light array unit 12 which is provided with an electronic control unit 13 connected to the sound system 100 so that the illumination from the light array unit 12 is responsive to the audio output from the sound system 100.

8 Claims, 1 Drawing Sheet

ILLUMINATED VEHICLE ANTENNAE CONSTRUCTION

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of automotive accessories in general, and in particular to an illuminated automobile antennae.

2. Description of Related Art

As can be seen by reference to the following U.S. Pat. Nos. 4,176,581; 4,394,656; 4,809,584; and 5,056,399, the prior art is replete with myriad and diverse light display apparatus that produce random and/or synchronized light displays in response to an audio output.

While all of the aforementioned prior art constructions are more than adequate for the basic purpose and function for which they have been specifically designed, they are uniformly deficient with respect to their failure to incorporate an audio responsive light display into a visible vehicle accessory.

As most automobile audio enthusiasts are well aware, the field of automotive sound systems is growing in leaps and bounds due to the large numbers of people who are upgrading and accessorizing their vehicle sound systems.

In addition, the marketplace is constantly looking for new products that will aesthetically enhance the sound quality and/or appearance of a given system.

As a consequence of the foregoing situation, there has existed a longstanding need for a new and improved vehicle accessory that will produce a new and unique light pattern that is directly responsive to the output of the automobile sound system and the provision of such a device is a stated objective of the present invention.

BRIEF SUMMARY OF THE INVENTION

Briefly stated, the illuminated automobile antennae device that forms the basis of the present invention comprises in general an antennae housing unit, a light array unit disposed on the antennae housing unit, and an electronic control unit operatively connected to the light array unit and a vehicle sound system for varying the illumination pattern of the light array in response to the audio output of the vehicle sound system.

As will be explained in greater detail further on in the specification, the housing unit is designed to be magnetically attached to the chassis of a vehicle and provided with electrical leads that are coupled to the vehicle sound system wherein the new antennae device is either substituted for a conventional whys antennae or electrically coupled to the more recent hidden antennae.

In addition, the light array comprises vertically aligned light strings wherein the sequential illumination of the lights in the light strings is governed by the audio output of the vehicle sound system and when a maximum decibel level is reached, say for example, 40 dB, an illuminated signal will be generated at the very top of the light strings to signify that event.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
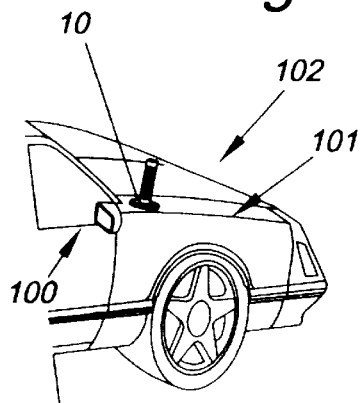
FIG. 1 is a perspective view of the illuminated vehicle antennae that forms the basis of this invention installed on a vehicle.
Figure 2:
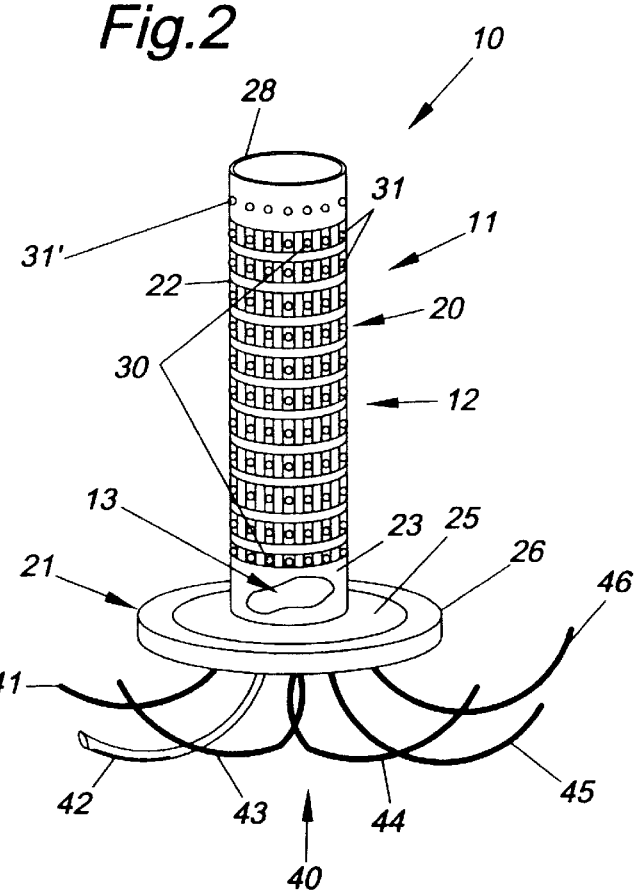
FIG. 2 is an isolated perspective view of the antennae construction.

As can be seen by reference to the drawings, and in particularly to FIGS. 1 and 2, the illuminated vehicle antennae construction that forms the basis of the present invention is designated generally by the reference number 10. The antennae construction 10 comprises in general a housing unit 11, a light array unit 12, and an electronic control unit 13 operatively connected to a vehicle sound system designated generally as 100. These units will now be described in seriatim fashion.

Figure 3:
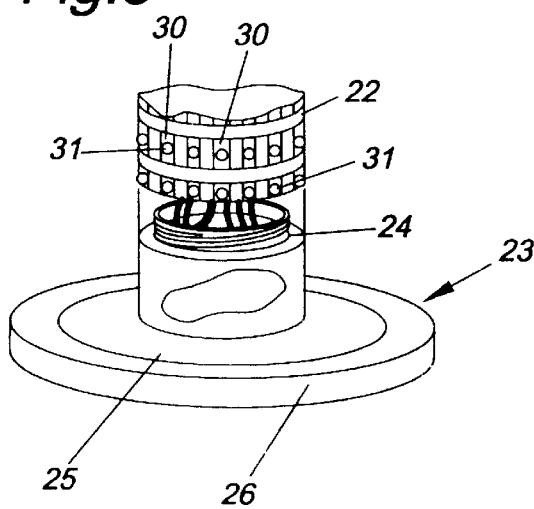
FIG. 3 is an exploded perspective view of the lower portion of the antennae.

As can best be seen by reference to FIGS. 1 through 3, the housing unit 11 comprises in general an elongated cylindrical housing member 20 provided with an enlarged disc shaped base 21 wherein the base 21 is magnetically or otherwise secured in a conventional fashion to the chassis 101 of a vehicle 102.

As shown in FIGS. 2 and 3, the interior of the housing member 20 is hollow and comprises an elongated upper portion 22 and a truncated lower portion 23 threadably engaged with one another and provided with a sealing gasket 24 to make the housing member waterproof. In addition, in the preferred embodiment of the invention, the base 21 is attached to the lower portion 23 of the housing member 20 and provided with an inner magnetic element 25 which is surrounded by an outer stainless steel rim 26.

Still referring to FIGS. 2 and 3, it can be seen that the light array unit 12 comprises a plurality of vertically arrayed bar graph strips 30 having a plurality of spaced lights 31. The bar graph strips are arranged in a circular pattern to surround the elongated upper portion 22 of the housing member 20.

In the preferred embodiment illustrated in the drawings, each of the light strips 30 are provided with a different color string of lights 31 with the exception that the last or uppermost light 31 is white, as is the surrounding uppermost end 28 of the housing member 20. However, it is to be noted that in keeping with the teachings of this invention, each of the light strips 30 may include multi-colored lights 31 arranged either in a pattern or randomly distributed along the running length of each light strip 30. The uppermost light 31' will preferably be white.

Figure 4:
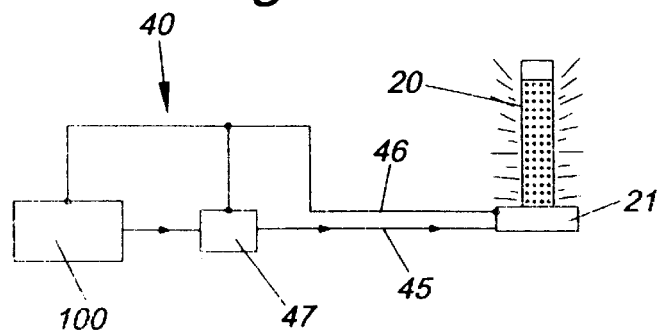
FIG. 4 is a schematic wiring diagram of the electronic control unit.

As can be seen by reference to FIGS. 2 through 4, the electronic control unit 13 comprises a plurality of electronic leads designated generally as 40 which are disposed within the interior of the hollow housing member 20. The electronic leads 40 comprise a ground wire 41, an antennae wire 42, positive 43 and negative 44 power wires, and positive 45 and negative 46 speaker wires. The output of the vehicle sound system 100 can be transmitted through the positive power wire 43 to a bar graph electronics circuit 47 to illuminate a selected number of lights 31 in each light string 30 in response to the decibel output of sound system 100.

As a consequence of the foregoing situation, the light 31 on the housing member 20 will appear to rise and fall in rhythm with the sound system output producing an aesthetically pleasing visual effect and when the sound output peaks at a selected maximum value (e.g., 40 dB), the top of the housing member 20 will be illuminated by the white lights 31' thereby producing a particularly dramatic visual effect.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooded parts together, whereas, a screw employs a helical surface, in the environment of fastening wooden parts, a nail and a screw may be equivalent structures.

What is claimed is:

1. An illuminated antennae construction for a vehicle equipped with a sound system wherein the antennae construction comprises:
   a housing unit including an elongated generally cylindrical housing member provided with a base which is secured to a selected portion of said vehicle wherein the housing member is hollow and contains a vehicle antenna wire;
   a plurality of vertically oriented bar graphs light strips disposed in a side by side surrounding relationship with the external periphery of the generally cylindrical housing member; and
   means for energizing a selected plurality of vertically oriented bar graph light strips in response to the output of said sound system.

2. The construction as in claim 1 wherein each of the bar graph light strips are provided with a plurality of lights.

3. The construction as in claim 2 wherein said plurality of lights include at least one white light.

4. The construction as in claim 3 wherein the remainder of said plurality of lights are colored.

5. The construction as in claim 4 wherein the remainder of said plurality of lights are the same color pattern for each light strip.

6. The construction as in claim 4 wherein the remainder of said plurality of lights of each light strip are the same color pattern in each light strip.

7. The construction as in claim 4 wherein the remainder of said plurality of lights of each light strip have a different color pattern in each light strip.

8. The construction as in claim 3 wherein the at least one light is disposed at the top of each bar graph light strip.

* * * * *